United States Patent [19]

Kaneno et al.

[11] Patent Number: 5,094,910
[45] Date of Patent: Mar. 10, 1992

[54] MAGNETIC RECORDING MEDIUM

[75] Inventors: Kimihiko Kaneno, Nagaokakyo; Yoshinori Yamamoto, Takatsuki, both of Japan

[73] Assignee: Hitachi Maxell, Ltd., Osaka, Japan

[21] Appl. No.: 408,284

[22] Filed: Sep. 18, 1989

[30] Foreign Application Priority Data

Sep. 24, 1988 [JP] Japan ................. 63-239145

[51] Int. Cl.⁵ ............................. G11B 23/00
[52] U.S. Cl. ................. 428/329; 428/425.9; 428/694; 428/900
[58] Field of Search ........ 428/329, 323, 425.9, 428/694, 900

[56] References Cited

U.S. PATENT DOCUMENTS

| | | | |
|---|---|---|---|
| 4,525,424 | 6/1985 | Bradshaw et al. | 428/425.9 |
| 4,788,103 | 11/1988 | Okita et al. | 428/425.9 |
| 4,795,672 | 1/1989 | Takeda et al. | 428/425.9 |
| 4,801,505 | 1/1989 | Ejiri et al. | 428/425.9 |
| 4,968,557 | 11/1990 | Ejiri et al. | 428/425.9 |
| 4,988,574 | 1/1991 | Murphy et al. | 428/425.9 |

*Primary Examiner*—Paul J. Thibodeau
*Attorney, Agent, or Firm*—Birch, Stewart, Kolasch & Birch

[57] ABSTRACT

A magnetic recording medium which comprises a substrate and a magnetic layer formed thereon comprising a magnetic metal powder, an abrasive and, as the binder resin, a polyurethane resin having cyclohexyl rings in its molecular chain and a vinyl chloride base resin containing hydroxyl groups, which has improved durability.

7 Claims, No Drawings

MAGNETIC RECORDING MEDIUM

BACKGROUND OF THE INVENTION

1. Field of the Invention

The present invention relates to a magnetic recording medium having improved durability.

2. Description of the Related Art

A magnetic recording medium is usually produced by coating a magnetic paint comprising magnetic powder, a binder, an organic solvent and optionally other additives on a substrate such as a polyester film and drying the coated magnetic paint to form a magnetic layer. The magnetic recording medium is required to have not only good electromagnetic conversion properties, such as high sensitivity and a high S/N ratio, but also good durability. Recently, to improve the performances of the magnetic recording medium, magnetic metal powder which is suitable for recording in a shorter wavelength range is used together with a binder component, such as a polyurethane resin, which contains an aliphatic ester as a polyester component and a vinyl chloride/vinyl acetate copolymer.

When the magnetic metal powder is used together with the binder component, such as the above polyurethane resin and the vinyl chloride/vinyl acetate copolymer, the S/N ratio is improved, although film strength of the magnetic layer deteriorates so that durability, such as still durability of a video tape, is decreased or clogging or contamination of a magnetic head tend to occur.

The present inventors have investigated the causes for the clogging and contamination of a magnetic head, and found that, due to friction between the magnetic recording medium and the magnetic head during traveling, the surface temperature of the magnetic layer rises so that the binder component, such as the polyurethane resin and the vinyl chloride/vinyl acetate resin, is softened whereby the force for retaining the magnetic powder deteriorates, and dropped powder particles cause clogging and contamination of the magnetic head. Further, it was found that, as the glass transition temperature of the binder resin increases, the film strength of the magnetic layer increases, so that clogging and contamination of the magnetic head are suppressed. Further investigation revealed that the glass transition temperature of the binder resin depends on the glass transition temperature of the polyurethane resin present, and when an aromatic ester is used as a polyester component of the polyurethane resin, the clogging and contamination of the magnetic head are prevented, although the repeated traveling durability of the magnetic recording medium is decreased.

SUMMARY OF THE INVENTION

One object of the present invention is to provide a binder component which can impart good durability to a magnetic layer of a magnetic recording medium.

Another object of the present invention is to provide a magnetic recording medium having improved durability while it suppresses clogging and contamination of the magnetic head.

Accordingly, the present invention provides a magnetic recording medium which comprises a substrate and a magnetic layer formed thereon comprising a magnetic metal powder, an abrasive and, as the binder resins, a polyurethane resin having cyclohexyl rings in the molecular chain and a vinyl chloride base resin.

DETAILED DESCRIPTION OF THE INVENTION

The polyurethane resin to be used as one of the binder components in the magnetic layer according to the present invention has cyclohexyl rings in the molecular chain. Since such a polyurethane has a high glass transition temperature and good affinity for the magnetic metal powder, dispersibility of the metal powder in the resin is improved so that the electromagnetic conversion performance is improved and the film strength of the magnetic layer is increased, so that clogging and contamination of the magnetic head are sufficiently suppressed and repeated traveling durability is significantly increased.

Preferably, the polyurethane resin having the cyclohexyl rings in the molecular chain can be prepared by reacting an ester having the cyclohexyl ring, which is obtained through a reaction between at least one compound selected from the group consisting of adipic acid, azelaic acid and 1,12-dodecanedioic acid and cyclohexanedimethanol, with an isocyanate (e.g. tolylene diisocyanate, diphenylmethane diisocyanate, hexamethylene diisocyanate, etc.). Examples of commercially available polyurethane resins having the cyclohexyl rings in the polyester component are Morcene CA 310 and Morcene CA 319 (manufactured by Morton-Norwitch) and Estan 5706 (manufactured by B. F. Goodrich).

Examples of the vinyl chloride base resin are vinyl chloride/vinyl acetate/vinyl alcohol copolymers, vinyl chloride/hydroxypropyl acrylate/vinyl acetate copolymers, vinyl chloride/hydroxyethyl acrylate copolymers, and the like. Among them, those having a chlorine content of at least 46 % by weight and a hydroxyl content of at least 0.2 by weight are preferably used. Such a vinyl chloride base resin has good compatibility with the polyurethane resin having the cyclohexyl rings in the molecular chain, and the glass transition temperature of the binder resin composition is raised, so that the film strength of the magnetic layer is sufficiently increased, whereby clogging and contamination of the magnetic head is sufficiently prevented and the repeated traveling durability is further improved.

When the vinyl chloride base resin has the hydroxyl groups, it has good affinity with the magnetic metal powder and increases the dispersibility of the metal powder in the binder resin. Examples of commercially available vinyl chloride base resin are VAGH an VAGF (manufactured by U.C.C., USA), and Eslek A and Eslek E (manufactured by Sekisui Chemical Industries, Japan).

The weight ratio of the vinyl chloride base resin to the urethane resin having the cyclohexyl rings in the molecular chain is from 2:8 to 8:2, preferably from 7:3 to 3:7. When the content of the vinyl chloride base resin is too large, the desired effect such as the repeated traveling durability of the present invention cannot be achieved, while if it is too small, the glass transition temperature of the binder resin is not sufficiently raised so that the clogging and contamination of the magnetic head cannot be suppressed.

The binder resin comprising the vinyl chloride base resin and the polyurethane resin may further contain an isocyanate compound having a low molecular weight. When the low molecular weight isocyanate compound is used in the binder resin, it reacts with the hydroxyl groups in the vinyl chloride base resin and/or with the polyurethane resin having the cyclohexyl groups in the molecular chain to effect cross linking, whereby the film strength of the magnetic layer and, in turn, the durability of the magnetic layer are further improved.

Examples of the commercially available low molecular weight isocyanate compound are Colonate L, Colonate HL, Colonate 2036 and Colonate 3015 (manufactured by Nippon Polyurethane Industries), Desmodule 15, Desmodule E14 and Sumidule L (manufactured by Sumitomo Bayer Urethane).

The amount of the low molecular weight isocyanate compound is not more than 20% by weight based on the total weight of the binder resin components. When the amount of the low molecular weight isocyanate compound is too large, the magnetic layer tends to become very hard and brittle.

The weight ratio of the magnetic metal powder to the total weight of binder resin components is preferably from 90:10 to 70:30, more preferably from 85:15 to 78:22.

The abrasive contained in the magnetic layer may be any of the conventionally used abrasives. Examples of the abrasive are alumina, chromium oxide, red iron oxide, titanium oxide, zinc white, and the like. Preferably, the abrasive has an average particle size of from 0.1 to 1.0 μm. Among the abrasives, alumina having an average particle size of 0.1 to 1.0 μm is preferred.

The magnetic metal powder may be any one of conventionally used magnetic metal powder. Examples of the magnetic metal powder are α-Fe, Fe-Co, Fe-Ni, Fe-Co, and the like. Preferably, the magnetic metal powder contains aluminum on its particle surface or in the particles, so as to improve the dispersion stability of the magnetic paint. When the magnetic metal powder contains aluminum, the amount of aluminum is from 0.5 to 7.0 % by weight based on the weight of iron. Preferably, the metal powder has a BET specific surface area of at least 40 $m^2/g$ and coercive force of at least 1000 Oe.

The magnetic recording medium of the present invention can be produced by a per se conventional method. For example, on a substrate such as a polyester film, a magnetic paint containing the magnetic metal powder, the polyurethane resin having the cyclohexyl rings in the molecular chain, the vinyl chloride base resin, the abrasive, the organic solvent and optionally the isocyanate compound or other additives is applied by spraying or roll coating, followed by drying.

The organic solvent can be any one in which the binder resins are soluble. Examples are methyl isobutyl ketone, methyl ethyl ketone, cyclohexanone, toluene, ethyl acetate, tetrahydrofuran, dioxane, dimethylformaide, and mixtures thereof.

The magnetic paint may contain any conventional additive, such as a dispersant, a lubricant, and/or an antistatic agent.

PREFERRED EMBODIMENTS OF THE INVENTION

The present invention will be illustrated in detail by the following examples, in which "parts" and percentages are by weight unless otherwise indicated.

EXAMPLE 1

The following components were mixed and dispersed in a ball mill for 48 hours:

| Component | Parts |
| --- | --- |
| α-Fe magnetic powder (Aluminum content: 5% based on iron. coercive force: 1600 Oe. BET specific surface area: 47 $m^2/g$) | 80 |
| VAGH (manufactured by U.C.C., USA, a vinyl chloride/vinyl acetate/vinyl alcohol copolymer) | 10 |
| Morcene CA 310 (manufactured by Morton-Norwitch, a polyurethane resin having the cyclohexyl rings in the molecular chain) | 6 |
| Alumina powder | 4.8 |
| Carbon black | 4.0 |
| Myristic acid | 2.4 |
| n-Butyl stearate | 1.6 |
| Methyl ethyl ketone | 125 |
| Cyclohexanone | 75 |
| Toluene | 50 |

To the mixture, a trifunctional low molecular weight isocyanate compound (Colonate L manufactured by Nippon Polyurethane) (4 parts in terms of solid component) was added and mixed for 1 (one) hour followed by filtration to obtain a magnetic paint.

Then, the magnetic paint was coated on a polyester film having a thickness of 10 μm, a magnetic field was applied along the longitudinal direction of the film, and the coated magnetic paing was dried to form a dry magnetic layer of 3.0 μm, which was subjected to surface smoothening treatment. The film was cut to a width of 8 mm to obtain a video tape.

EXAMPLE 2

In the same manner as in Example 1 but using Morcene CA 139 (manufactured by Morton-Norwitch, a polyurethane resin having the cyclohexyl rings in the molecular chain) in the same amount in place of Morcene CA 310, a video tape was produced.

EXAMPLE 3

In the same manner as in Example 1 but using Estan 5706 (manufactured by B. F. Goodrich, a polyurethane resin having the cyclohexyl rings in the molecular chain) in the same amount in place of Morcene CA 310, a video tape was produced.

Comparative Example 1

In the same manner as in Example 1 but using Nipporan N 2301 (manufactured by Nippon Polyurethane Industries, Ltd, a polyurethane resin having an aliphatic ester) in the same amount in place of Morcene CA 310, a video tape was produced.

Comparative Example 2

IN the same manner as in Example 1 but using Vilon UR-8300 (manufactured by Toyobo, a polyurethane resin having an aromatic ester) in the same amount in place of Morcene CA 310, a video tape was produced.

With each of the video tapes produced in Examples and Comparative Examples, the clogging and contamination of the magnetic head were evaluated by measuring still durability, and also repeated traveling durability was examined.

The still durability is evaluated by measuring a time in which the reproducing output decreases by 6 dB in comparison with the original output with an 8 mm video camera (manufactured by Sony). The repeated traveling durability is evaluated by measuring travel numbers at which the reproducing output decreases by 6 dB in comparison with that in the first travel.

The results are shown in following Table.

TABLE

| Example No. | Still durability | Repeated traveling durability |
|---|---|---|
| 1 | 200 | more than 1500 |
| 2 | 250 | ↑ |
| 3 | 250 | ↑ |
| Comp. 1 | 60 | 1000 |
| Comp. 2 | 120 | 500 |

As understood from the results of Table, the video tapes of the present invention (Examples 1-3) have improved still durability and repeated traveling durability in comparison with the video tapes produced in Comparative Examples 1 and 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium which comprises a substrate and a magnetic layer formed thereon comprising a magnetic metal powder, an abrasive and, as the binder resin, a polyester-polyurethane resin having cyclohexyl rings in its molecular chain and a vinyl chloride base resin having hydroxyl groups, in a weight ratio of said vinyl chloride base resin to said urethane resin of from 2:8 to 8:2.

2. The magnetic recording medium according to claim 2, wherein said cyclohexyl rings are present in the polyester unit of said polyurethane resin.

3. The magnetic recording medium according to claim 1, wherein said magnetic metal powder contains aluminum in the particles and/or on the surface of the particles in an amount of from 0.5 to 7.0% by weight based on the weight of iron, and has a coercive force of at least 1000 Oe.

4. The magnetic recording medium according to claim 1, wherein said abrasive is alumina having an average particle size of from 0.1 to 1.0 μm.

5. The magnetic recording medium according to claim 1, wherein said hydroxyl group content in said vinyl chloride base resin is at least 0.2% by weight.

6. The magnetic recording medium according to claim 1, wherein content of chlorine in said vinyl chloride base resin is at least 46% by weight.

7. A magnetic recording medium according to claim 1, further including an isocyanate compound.

* * * * *